Figure 1:
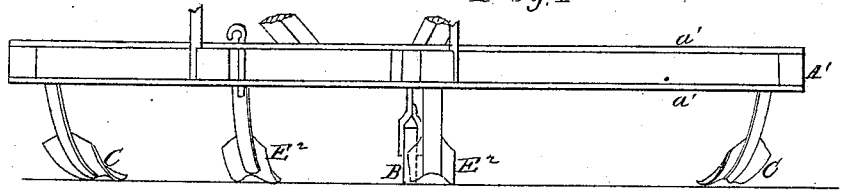
Figure 2:
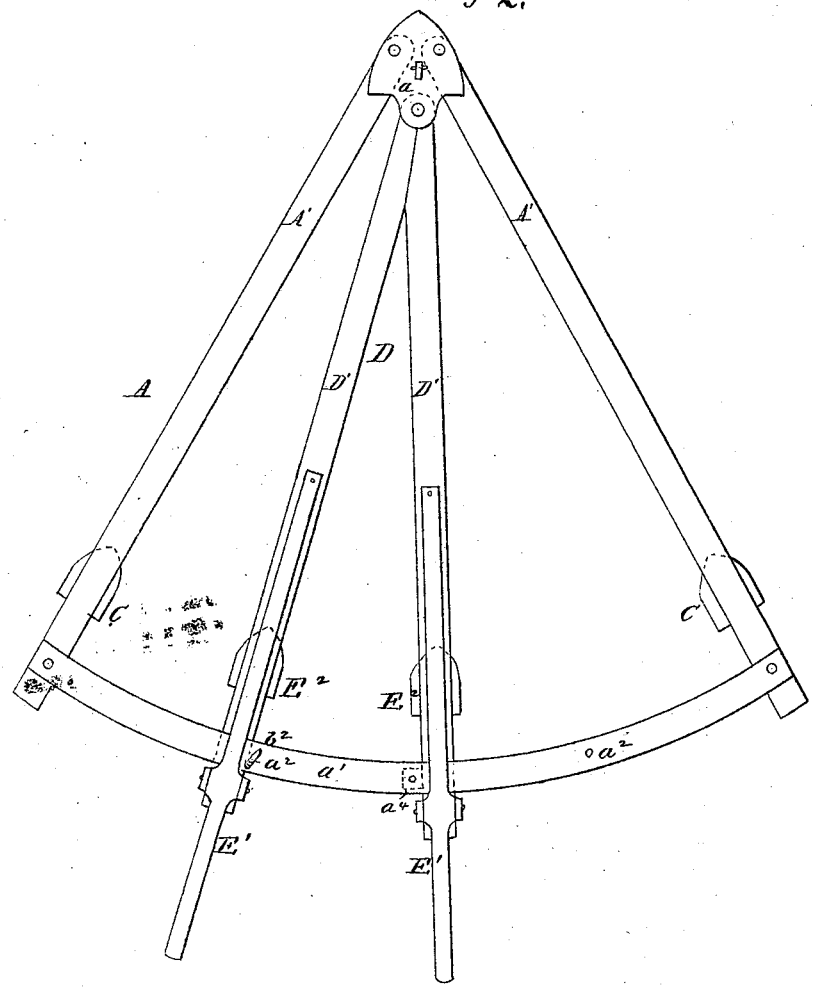

H. K. KRIEBLE.
Cultivators.

No. 136,249. Patented Feb. 25, 1873.

Witnesses
Martin Connolly
Anthony Connolly

Inventor
Hosea K. Krieble
Connolly Bros
Atty's

UNITED STATES PATENT OFFICE.

HOSEA K. KRIEBLE, OF LANDSDALE, PENNSYLVANIA.

IMPROVEMENT IN CULTIVATORS.

Specification forming part of Letters Patent No. 136,249, dated February 25, 1873.

*To all whom it may concern:*

Be it known that I, HOSEA K. KRIEBLE, of Landsdale, in the county of Montgomery and State of Pennsylvania, have invented certain new and useful Improvements in Cultivators; and I do hereby declare the following to be a full, clear, and exact description of the invention, such as will enable others skilled in the art to which it appertains to make and use it, reference being had to the accompanying drawing which forms part of this specification.

My invention has reference to cultivators, and particularly to the class known as one-horse cultivators. The object of my invention is to provide a walking-cultivator to be drawn by one horse, and so constructed that a row of corn may be cultivated in each passage over the field. My invention consists in the construction and arrangement of parts, having reference particularly to an internal frame which can be swung from side to side, for a purpose hereinafter explained, or which may be taken from the main frame and used separately, if desired.

Referring to the drawing, A shows a triangular frame, consisting of the side beams A' A', bolted in front to the plates $a$, and in the rear to the cross-bars $a^1$ $a^1$. This frame is provided with a vertically-adjustable guide-wheel, B, and hoes or shovels C C. The internal frame is shown at D, consisting of the bars D' D', which are bolted firmly together, and pivoted, as seen, to the plates $a$ $a$. The frame D is provided with handles E$^1$ E$^1$, and two hoes or shovels, E$^2$ E$^2$, though three shovels may be employed, if desired. The cross-bars $a^1$ $a^1$ have holes $a^2$ $a^2$, and a pin, $b^2$, by which the internal frame D is held in position when duly adjusted.

A short standard, $a^4$, is also located exactly in the center and between the bars $a^1$ $a^1$.

The operation is as follows: The frame D being adjusted on either side, and fastened by the pin $b^2$, the row of corn to be cultivated is straddled so that three shovels (the two on the inner frame and the adjacent one on the main frame) shall be on one side of the row, and the remaining single hoe on the main frame on the other side. On reaching the end of the row the frame is swung to the other side, and the next row cultivated.

It will thus be seen that in going across the field in one direction three hoes pass between two rows, and in returning one hoe passes between the same two rows, whereby a row is cultivated in passing from one side of the field to the other, or two rows in going and returning to the side from which the start is made.

Claims.

1. The combination of the frames A and D, constructed and arranged as shown, the said frames being pivoted or hinged together in front so as to permit the inner frame to be swung from side to side, as and for the purpose set forth.

2. The cultivator consisting of the triangular main frame A, holding the plates $a$, cross-guides $a^1$ with holes $a^2$ and standard $a^4$ and shovels C, and the pivoted frame D having shovels E$^2$ and handles E$^1$, substantially as specified.

In testimony that I claim the foregoing I have hereunto set my hand this 30th day of January, 1873.

HOSEA K. KRIEBLE.

Witnesses:
GEO. C. SHELMERDINE,
M. DANL. CONNOLLY.